United States Patent [19]

Dubos et al.

[11] 4,209,227

[45] Jun. 24, 1980

[54] END STRUCTURE FOR A BUNDLE OF OPTICAL FIBRES ARRANGED IN A HEXAGON

[75] Inventors: Jacques Dubos; André Jacques, both of Paris, France

[73] Assignee: Thomson-CSF, Paris, France

[21] Appl. No.: 772

[22] Filed: Jan. 2, 1979

[30] Foreign Application Priority Data

Jan. 6, 1978 [FR] France .................. 78 00307

[51] Int. Cl.² ............................................. G02B 5/16
[52] U.S. Cl. .............................. 350/96.22; 350/96.20
[58] Field of Search ................ 350/96.20, 96.21, 96.22

[56] References Cited

U.S. PATENT DOCUMENTS

| | | | |
|---|---|---|---|
| 3,846,010 | 11/1974 | Love et al. ........................ | 350/96.22 |
| 3,936,145 | 2/1976 | McCartney ........................ | 350/96.22 |
| 4,009,931 | 3/1977 | Malsby et al. ..................... | 350/96.22 |
| 4,021,098 | 5/1977 | McCartney et al. .............. | 350/96.22 |
| 4,133,601 | 1/1979 | LeGuen et al. ................... | 350/96.22 |
| 4,139,260 | 2/1979 | Bouygues et al. ................ | 350/96.22 |

Primary Examiner—Stewart J. Levy
Attorney, Agent, or Firm—Cushman, Darby & Cushman

[57] ABSTRACT

The present invention relates to an end structure for a bundle of optical fibres arranged in a hexagon which comprises more particularly a cylindrical alignment member having one end which is adjacent to the end to be connected and comprises three regular points adapted to be fitted in three similar points of an identical end structure. This alignment member is previously angularly oriented relative to the bundle of fibres arranged in a hexagon so that its points have a given position relative to the hexagon formed by the fibres.

7 Claims, 3 Drawing Figures

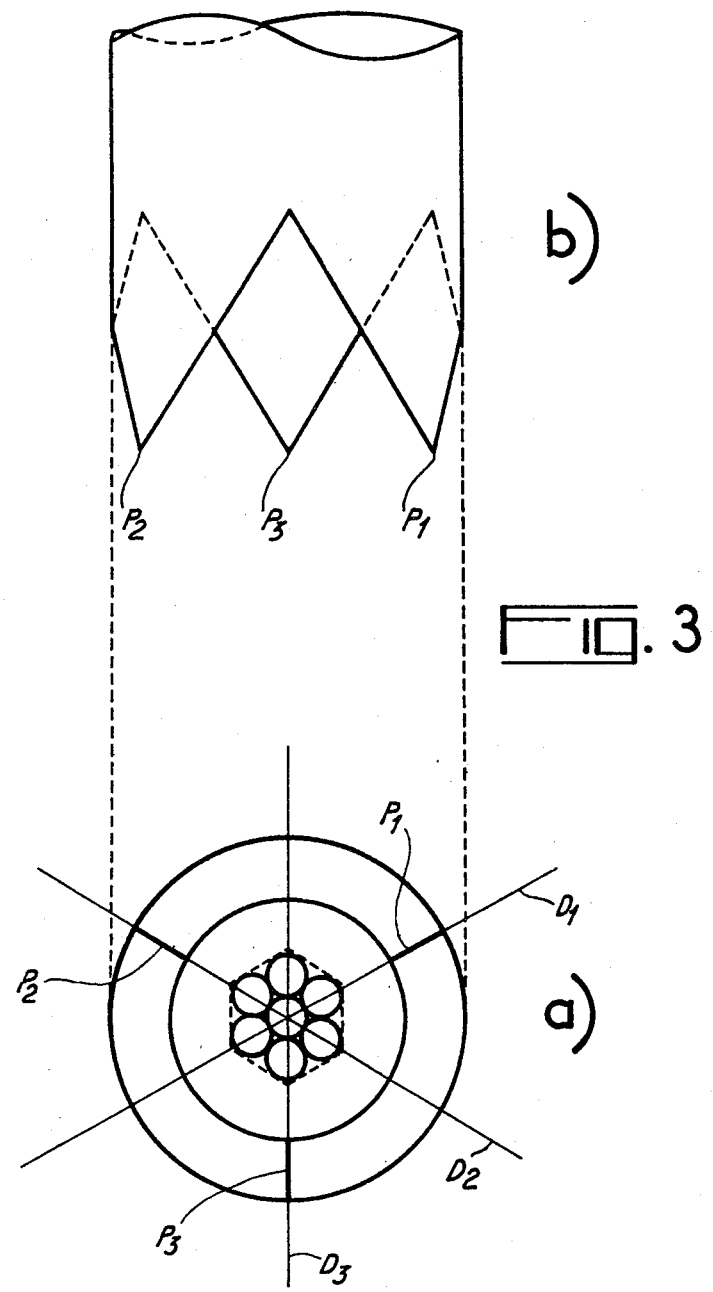

END STRUCTURE FOR A BUNDLE OF OPTICAL FIBRES ARRANGED IN A HEXAGON

BACKGROUND OF THE INVENTION

1. Field of the Invention

The invention relates to the connection of bundles of optical fibres and more particularly to an end structure for bundles of optical fibres having a hexagonal arrangement and a connector using said end structures.

2. Description of the Prior Art

It is known that bundles of optical fibres comprising a number of fibres of the same diameter, so that these fibres can be arranged in a hexagon, are particularly adaptable to direct connections between bundles. Indeed, when the fibres of the two bundles to be connected are compressed, the fibres arrange themselves in practically perfect hexagons with the fibres tangent to one another. Such an arrangement consequently provides bundles having maximum compactness. If the end structures are such that the hexagons formed by the fibres are angularly located relative to the end structures, it is possible to connect two similar end structures without hesitation, since the fibres of the two connected bundles are disposed individually in end-to-end relation. Devices comprising within the end structures themselves hexagonal members which are oriented relative to the hexagons of the fibres, the hexagonal arrangement being achieved by insertion of the fibres in the hexagonal members, have been previously described. Such devices are expensive since they require hexagonal members which are very precisely machined so that the fibres of the bundles are suitably maintained and yet are capable of being inserted therein.

SUMMARY OF THE INVENTION

An object of the invention is to provide simple end structures for bundles of optical fibres having hexagonal arrangements which are inexpensive and enable, upon connecting the end structures, the problems of the angular positioning of one bundle relative to the other to be solved simply.

In particular, the end structure according to the invention is such that it comprises a cylindrical body in which the fibres of a bundle can be arranged so as to form at the end a compact hexagonal arrangement; an alignment member having the same axis as the cylindrical body bears against the outer surface of said body and is angularly oriented relative to the hexagon formed by the fibres.

BRIEF DESCRIPTION OF THE DRAWINGS

For a better understanding of the present invention and to show how the same may be carried into effect, reference will be made to the following description and the attached drawings among which:

FIG. 3(a) and FIG. 3(b) respectively represent, in cross section at (a) and in side elevation at (b) the end of the end structure.

DESCRIPTION OF THE PREFERRED EMBODIMENTS

The end structure according to the invention is adapted to be provided for bundles of fibres comprising for example 7, 37 or 61 fibres (according to the formula $N=1+3n(n-1)$, in which N is the number of fibres and n any integer). Indeed, the fibres of such bundles may be arranged in a regular hexagon by a flowing thereof (when the fibres all have substantially the same diameters).

Figure 1:
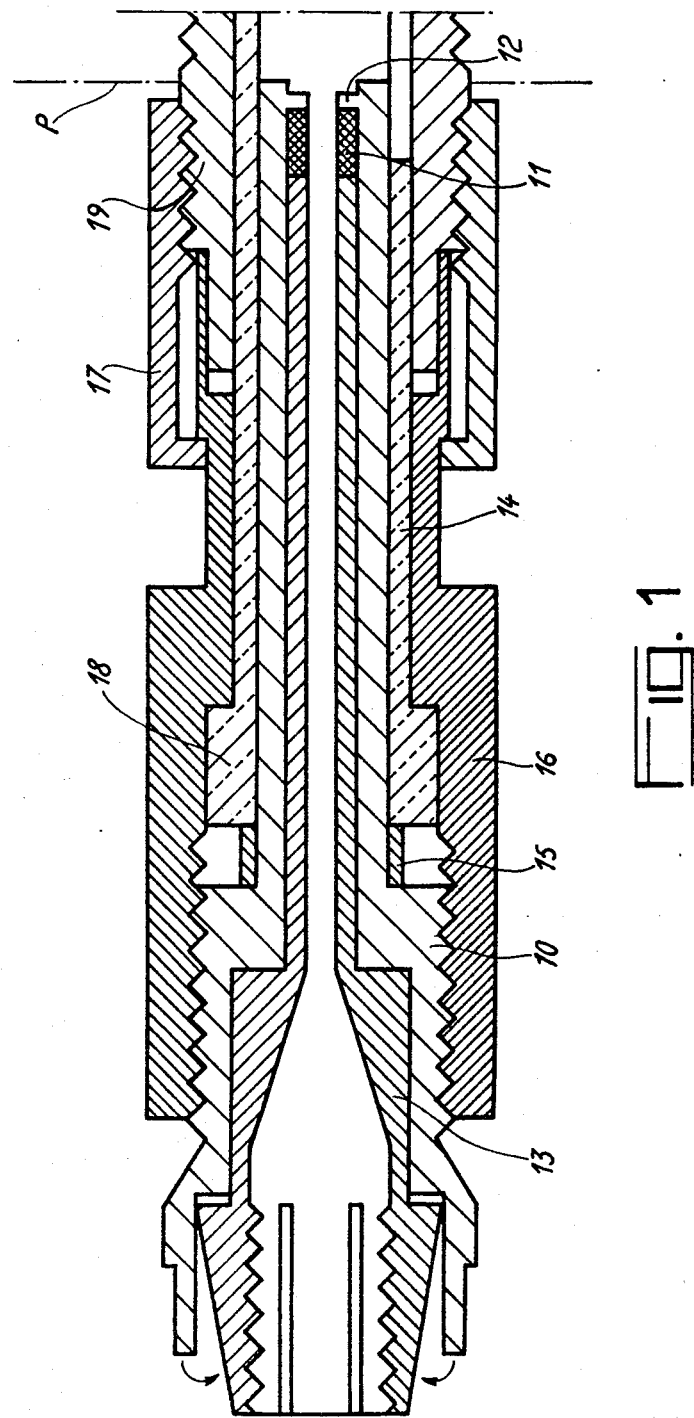
FIG. 1 represents a first embodiment of the end structure for a hexagonally arranged bundle according to the invention.

FIG. 1 represents a first embodiment of the end structure. In such a device, the positioning of the bundle relative to the end structure is defined by a cylindrical reference surface of revolution which is part of the outer periphery of the end structure. The centering of the bundle of fibres with respect to the reference surface and its arrangement according to a compact hexagonal assembly are obtained by compressing, in the longitudinal direction of the end structure, a washer of deformable material disposed in a cavity which is concentric with the reference surface and provided on the axis of the surface for the passage of the bundle.

For this purpose, the illustrated end structure consequently comprises a cylindrical outer member 10 having a circular cross-section and a cavity of the same shape in which the washer 11 of deformable material is inserted. This washer bears against a ring-shaped abutment, 12, which is part of the cylindrical member 10. After the insertion of the bundle of fibres in the end structure the piston 13 exerts a pressure on the washer 11 and causes it to closely grip around the bundle, the axial compression producing a radial deformation. For this purpose, the rear of the piston 13 terminates in a frustoconical portion in which are formed four slots which are parallel to the axis of the end structure. The whole of this frustoconical portion, which is provided with teeth on its cylindrical inner face, forms a jaw which, owing to the play allowed by the slots and under the action of the deformable end of the member 10, grips the envelope of the bundle in the course of the crimping operation. Indeed, the end of the member 10 is deformed under the action of crimping pliers and exerts a pressure on the frustoconical portion of the piston 13. This pressure has for effect to cause the piston to slide toward the front end and thereby compress the washer 11, and also has for effect to deform the frustoconical portion which in this way maintains the envelope of the bundle.

If the fibres of the bundle all have substantially the same diameter and if the number N of fibres of the bundle satisfies the aforementioned formula, the compression of the fibres of the bundle results in a compact hexagonal arrangement which provides maximum compactness of the bundle. In order to connect two bundles of optical fibres arranged in this way, an alignment member must be provided in which the hexagon formed by the fibres will be very precisely oriented and which will fit in a similar member in which the second hexagon formed by the fibres of the second bundle will also be oriented, the fitting together being such that, as the hexagons are oriented in the prolongation of each other, the fibres of one bundle are exactly in alignement with the fibres of the other bundle. Losses in the transmission are in this way considerably reduced.

The alignment member 14 comprises a hollow cylindrical body which terminates adjacent the connector in three teeth each of which occupies a sector of 120°. FIG. 3(a) shows, the end of the end structure in cross-section and, at FIG. 3(b) the corresponding end of the alignment member. This alignment member is mounted in the following manner. A deformable metal washer 15, for example of lead, is fitted around the cylindrical body of the member 10 on which it assumes a position of abutment at a given distance from the end of the end structure. The alignment member is then mounted also on the cylindrical body of the member 10. This alignment member is fixed to the assembly by a fixing member 16 to which is permanently connected a movable member forming a nut 17 which is adapted to lock the connector when effecting the connection, as will be explained hereinafter. The member 16 is machined so as to bear against a reference flange 18 of the member 14 and has a screwing on the member 10. The various cylindrical cavities are all centered with respect to each other. The screwing of the fixing member 16 and the body 10 enables the alignment member 14 to be prepositioned, which prepositioning ensures that the various members are positioned on the axis of the end structure. There remains to effect an angular adjustment of the alignment member relative to the bundle of fibres so that three of the points of the hexagon are on the radii corresponding to the three points of the alignement member 14. This angular adjustment is achieved by rotating the member 10, and therewith the piston and the bundle, relative to the fixing member 16, which is stationary relative to the member 14, through a further angle so that the edges of the hexagon formed by the fibres are correctly positioned relative to the points of the alignment member. This additional movement, which is at the most equal to one sixth of a turn, is achieved by modification of the dimensions of the washer 15.

This adjustment is carried out when positioning the end structure on the bundle. For this purpose, there are provided an optical setting system which enables the image of the end of the bundle fibres to be projected, and cross-lines having the configuration of three intersecting straight lines which make at their intersection angles of 60°, namely $D_1$, $D_2$, and $D_3$ in FIG. 3(a). The three lines of the cross-lines are previously set on the three points $P_1$, $P_2$ and $P_3$ of the alignment member. Then, by turning the reference member 10, which is rigidly connected to the bundle, inside the fixing member 16, the points of the hexagon are brought into coincidence with the secant lines of the cross-lines.

The fixing of the end structure in this manner is consequently such that the bundle of fibres has maximum compactness and is centered with respect to a reference surface which is the outer face of the cylindrical body 10 and is oriented angularly relative to the alignment member which permits, when effecting the connection, automatically positioning the fibres of one bundle relative to the fibres of a second bundle having an identical end structure, merely by fitting them together.

FIG. 1 also partly shows the mechanical connecting member 19 for the connection. This connecting member, which is symmetrical relative to the plane P, is a hollow cylindrical membe which is externally screwthreaded at the diameter of the nut 17. The connection is achieved by screwing the fixing member 19 in the nut of one of the end structures, then bringing the other end structure in front of the first mentioned end structure in such manner as to cause the two alignement members 14 to interengage by imbrication, the ends of the bundles then being in contact in the plane P and the fibres of one of the bundles being automatically in facing relation to the fibres of the other bundle owing to the previous angular orientation achieved when the end structures provided with the interfitting alignement members are positioned on the bundles (as explained above). The nut of the second end structure is then screwed on the mechanical connecting member. Owing to the structure of the alignement members, the alignement of the two bundles is also achieved. The end structures are therefore capable of providing a rapid and precise connection of two hexagonal bundles.

Figure 2:
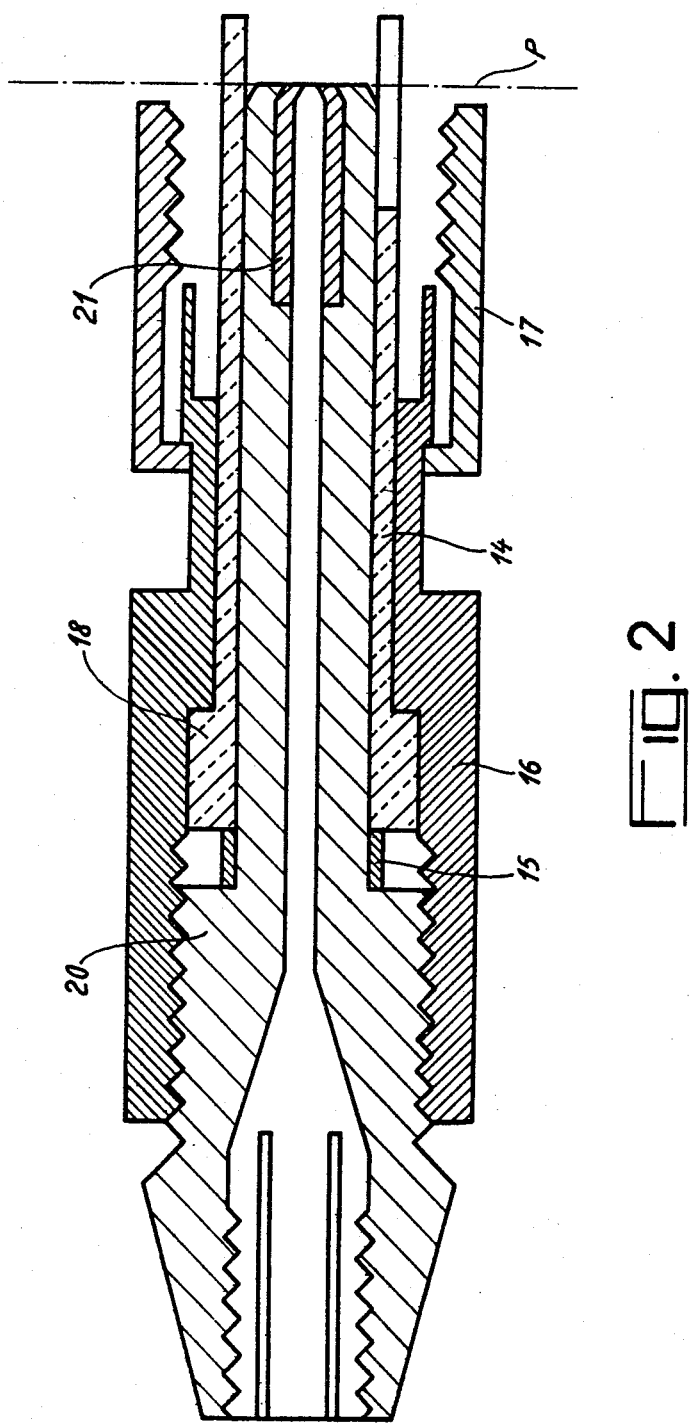
FIG. 2 represents a second embodiment of this end structure.

FIG. 2 shows another embodiment of the end structure which is simplified with respect to the first embodiment as concerns its structure. The hexagonal array or arrangement is no longer produced, as in the end structure shown FIG. 1, by a piston sliding in a cylindrical member and bearing in the axial direction of the end structure against a malleable sleeve surrounding the bundle until it arranges the fibres in the shape of a hexagon.

The end structure shown in FIG. 2 is crimped by radial pressure exerted on the circumference of the malleable sleeve. This crimping can be effected in a simple manner by a crimping device. For this purpose, the end structure comprises a cylindrical member 20 whose outer face is the reference surface for the centering of the various members to be connected with respect to each other. This member 20 comprises a recess in which a malleable sleeve 21 is placed. The bundle of fibres is inserted in the crimping device, which produces a radial compression of the sleeve around the fibres and thus permanently deforms the sleeve and the end structure which thus grips around the bundle. The crimping is effected until the bundle has reached its minimum section whereupon the fibres of the bundle are then arranged in a hexagon. The end of the bundle is then polished down to this plane of minimum section.

When this arrangement has been obtained, and in the same way as before, a ring 15, for example of lead, is placed on the cylindrical body 20. Then the alignement member 14 is also placed around this cylindrical body. The connecting member 16 is then screwed on the body 20 and this connection produces a precise axial positioning of the alignment member 14 relative to the body 20 and therefore relative to the plane P of the end of the bundle.

The fine angular positioning of the alignment member 14 relative to the hexagon defined by the fibres of the bundle is achieved by adjusting, by a rotation of at the most one sixth of a turn, this member 16 relative to the cylindrical body 20 by slightly modifying the sides of the washer 15. As in the end structure of FIG. 1, the connecting member 16 is provided with a nut which is trapped on this member 16 and adapted to connect this end structure to another end structure mounted on a similar bundle of fibres. The intermediate connecting member 19 has not been shown on this Figure.

The invention is not intended to be limited to the embodiments of the end structure described hereinbefore. In particular, any end structure is within the scope of the invention which comprises a cylindrical body in which the bundle of fibres is arranged so as to occupy, at the end to be connected, a hexagonal minimum section and comprises an alignment member having the same axis as the cylindrical body and capable of being fitted in a similar alignment member when making the connection, the corresponding alignment member being oriented angularly relative to the hexagonal arrangement of the fibres.

The fittable alignment member described is such that its end is cut away so as to form three teeth each of which occupies a sector of 120°, the points of these teeth being oriented on the radii on which the corners of the hexagon are located. It is possible to employ, for example, an alignment member having six teeth each of which occupies a sector of 60°. The orientation of a point of the alignment member with respect to a corner of the hexagon then results in a positioning of all the teeth relative to all the corners.

What we claim is:

1. An end structure for a bundle of optical fibres having an hexagonal arrangement, comprising a hollow cylindrical body whose outer surface, which is centered relative to its axis, is a reference surface for the positioning of other members forming the end structure and in which said fibres are placed, said fibres being maintained by a malleable sleeve placed inside said body which grips them so that they are arranged in a hexagon at the end to be connected, the end structure further comprising a cylindrical fittable alignment member, which bears on said outer surface, having an end cut away so as to form a regular profile having at least three points, the corners of which are, in the same section plane and at 120°, said alignement member being fixed to said body by a fixing device which permits an angular adjustment of the respective positions of the corners of said hexagon formed by the fibres and of said points, the length of the alignment member being such that the plane of the end to be connected is the median plane of said cut-away end.

2. An end structure as claimed in claim 1, wherein the bundle comprises N fibres, N being equal to $1+3n(n+1)$, in which n is an integer.

3. An end structure as claimed in claim 1, wherein said hollow cylindrical body has a screwthreaded rear part and a smooth front part whose diameter is less than the diameter of the rear part, the intermediate plane forming a reference surface for the axial positioning of the various parts of the end structure, and the fixing device comprises a washer mounted on the front part of the body and bearing against the intermediate plane and a hollow cylindrical fixing member bearing against the outer surface of the alignment member which is axially locked by the washer and is screwed on the screwthreaded rear part, the angular adjustment being effected by screwing the fixing member against the washer with force.

4. An end structure as claimed in claim 3, wherein a nut for connecting the end structure to a similar end structure is movably attached to the fixing member.

5. An end structure as claimed in claim 4, wherein the malleable sleeve is compressed by a force applied through a piston having the same axis as the body and capable of sliding inside the body in order to arrange the fibres in a hexagon.

6. An end structure as claimed in claim 4, wherein the malleable sleeve is disposed in a corresponding cavity provided in the body, the hexagonal arrangement of the fibres being previously effected by a circular crimping of the body and the sleeve around the bundle.

7. An end structure as claimed in any one of the preceding claims, wherein the end of the fittable alignment member comprises three points having bases, said bases each occupying a sector of 120° in the corresponding section plane, the apex angle of these points being equal to 60°, said alignment member being fittable in an identical member.

* * * * *